DRAFTSMAN.
114
BEST AVAILABLE COPY
Z. Phinney,
Washing Machine. Pounder
1,766X Patented June 19, 1812.
NO PRINTED SPECIFICATION AVAILABLE.
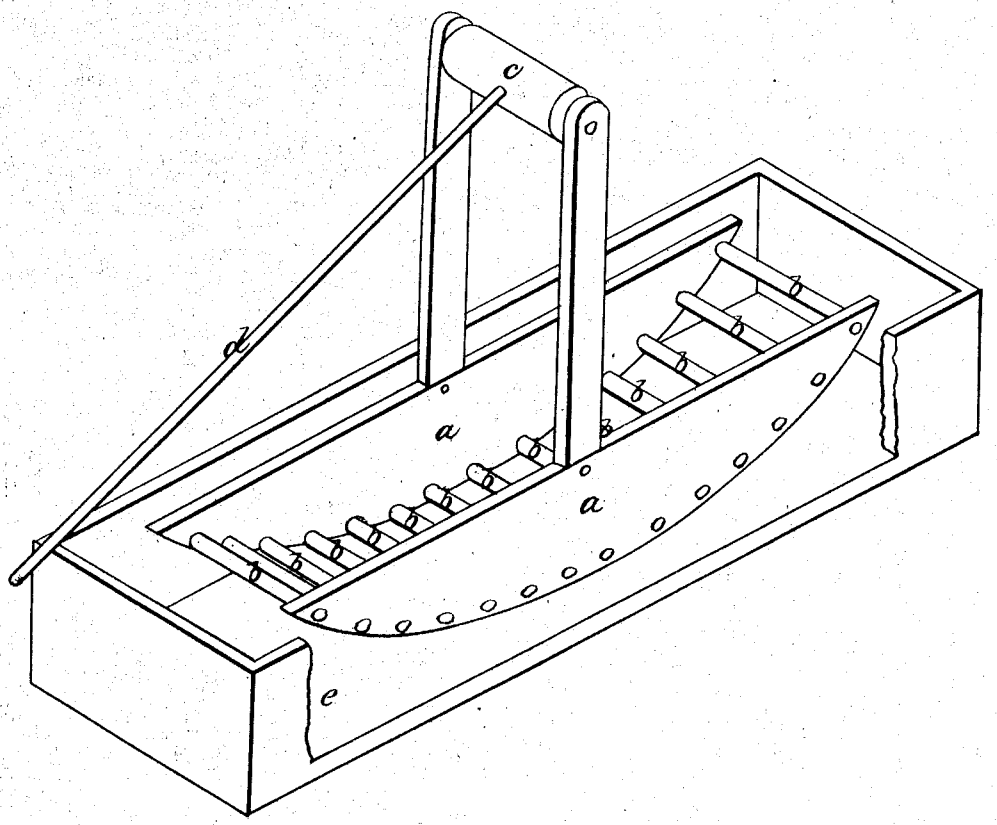
N. PETERS, PHOTO-LITHOGRAPHER, WASHINGTON, D. C.

United States Patent Office

PTO - BOYERS, PA Duty Station

MISSING PAGE TEMPORARY NOTICE

PATENT # X1760 FOR ISSUE DATE 6-19-1812

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

all text bo 1-10-94

Data Conversion Operation

Boyers, Pa